United States Patent [19]

Fischer

[11] Patent Number: 4,775,310
[45] Date of Patent: Oct. 4, 1988

[54] APPARATUS FOR MAKING A SEPARABLE FASTENER

[75] Inventor: James R. Fischer, Sheboygan, Wis.

[73] Assignee: Velcro Industries B.V., Amsterdam, Netherlands

[21] Appl. No.: 856,540

[22] Filed: Apr. 25, 1986

Related U.S. Application Data

[63] Continuation-in-part of Ser. No. 600,990, Apr. 16, 1984, abandoned.

[51] Int. Cl.$^4$ ............................................. B29C 59/04
[52] U.S. Cl. ................................... 425/308; 425/363; 425/378 R; 425/385; 425/814; 425/378.1
[58] Field of Search ............... 425/237, 335, 363, 377, 425/385, 387, 438, 814, 308, 378 R

[56] References Cited

U.S. PATENT DOCUMENTS

| | | | |
|---|---|---|---|
| 483,663 | 10/1842 | Warren | 425/350 |
| 819,150 | 5/1906 | Mahoney | 425/325 |
| 2,362,410 | 11/1944 | Scherer | 425/5 |
| 2,489,951 | 11/1949 | Bump | 425/461 |
| 2,907,365 | 10/1959 | MacDonald | 264/248 |
| 2,964,789 | 12/1960 | Condor et al. | 425/236 |
| 3,031,730 | 5/1962 | Morin | 24/444 |
| 3,085,292 | 4/1963 | Kindseth | 264/167 |
| 3,089,191 | 5/1963 | Conrad | 425/383 |
| 3,114,918 | 12/1963 | Cuckson et al. | 425/814 |
| 3,147,528 | 9/1964 | Erb | 24/452 |
| 3,175,026 | 3/1965 | James | 264/210.1 |
| 3,196,196 | 7/1965 | Burbank | 264/145 |
| 3,196,490 | 7/1965 | Erb | 425/121 |
| 3,235,438 | 2/1966 | Wisotzky | 264/243 |
| 3,241,182 | 3/1966 | Kessler | 425/327 |
| 3,243,339 | 3/1966 | Scragg et al. | 425/325 |
| 3,312,583 | 4/1967 | Rochlis | 425/373 |
| 3,316,592 | 5/1967 | Forrest | 425/174.8 |
| 3,317,644 | 5/1967 | Takai | 264/246 |
| 3,327,627 | 6/1967 | Esselen | 264/216 |
| 3,369,274 | 2/1968 | Dicks et al. | 425/174.8 E |
| 3,390,044 | 6/1968 | Malakoff | 428/17 |
| 3,394,431 | 7/1968 | Nalle, Jr. | 425/71 |
| 3,439,383 | 4/1969 | Meitinger | 425/115 |
| 3,445,915 | 5/1969 | Cuckson | 91/50 |
| 3,507,010 | 4/1970 | Doleman et al. | 425/134 |
| 3,555,601 | 1/1971 | Price | 425/327 |
| 3,557,407 | 1/1971 | Lemelson | 425/71 |
| 3,590,109 | 6/1971 | Doleman et al. | 264/167 |
| 3,594,863 | 7/1971 | Erb | 425/505 |
| 3,594,865 | 7/1971 | Erb | 425/129 R |

(List continued on next page.)

FOREIGN PATENT DOCUMENTS 297103 5/1954 Switzerland .

OTHER PUBLICATIONS

Process and Equipment for In-Line Post-Extrusion Forming, Plastic Machinery & Equipment, Sidney Levy, pp. 26–28, 30, Aug., 1978.

Slitting and Winding, Modern Plastics Encyclopedia 1980-1981, J. H. Rienau, pp. 472–474.

Primary Examiner—Willard E. Hoag
Attorney, Agent, or Firm—Hayes, Davis & Soloway

[57] ABSTRACT

Apparatus for continuously producing an elongated strip-like fastener member is disclosed which facilitates highly efficient formation of the fastener member with a great multiplicity of resiliently flexible hook-like projections. The method comprises the formation of an extrusion of plastic material which is shaped between a pair of coacting first and second rollers of the apparatus. Notably, one of the rollers is formed of a series of plates and defines a plurality of hook-forming cavities about its periphery within which the hook projections of the fastener member are formed. The forming roller is suitably cooled so as to effect substantial reduction in the temperature of the molten plastic extrusion form which the fastener member is formed. In this manner, the fastener member may be removed or stripped from the forming roller without opening of the hook-forming cavities, thus promoting highly efficient formation of the fastener member without resort to unduly complex equipment or processes. The fastener is uniquely configured and includes upstanding hook-like engaging elements having stem portions of at least partially arcuate configuration to produce a combination of properties previously unknown in such fasteners.

19 Claims, 4 Drawing Sheets

U.S. PATENT DOCUMENTS

| | | | |
|---|---|---|---|
| 3,708,833 | 1/1973 | Ribich et al. | 24/450 |
| 3,729,364 | 4/1973 | Doleman et al. | 428/17 |
| 3,732,600 | 5/1973 | Perina | 24/444 |
| 3,735,468 | 5/1973 | Erb | 425/814 |
| 3,752,619 | 8/1973 | Menzin et al. | 425/134 |
| 3,758,657 | 9/1973 | Menzin et al. | 264/166 |
| 3,762,000 | 10/1973 | Menzin et al. | 425/814 |
| 3,917,787 | 11/1975 | Hansen | 264/146 |
| 3,954,368 | 5/1976 | Kawakami | 425/354 |
| 3,988,401 | 10/1976 | Kasting et al. | 264/37 |
| 4,097,634 | 6/1978 | Bergh | 425/385 |
| 4,162,757 | 7/1979 | Lemelson | 425/327 |
| 4,169,303 | 10/1979 | Lemelson | 428/62 |
| 4,289,470 | 9/1981 | Johnston | 425/336 |
| 4,290,174 | 9/1981 | Kalleberg | 428/40 |
| 4,323,533 | 4/1982 | Bramhall | 264/145 |
| 4,451,421 | 5/1984 | Jones et al. | 264/167 |

APPARATUS FOR MAKING A SEPARABLE FASTENER

This application is a continuation-in-part of application Ser. No. 600,990; filed Apr. 16, 1984 now abandoned.

TECHNICAL FIELD

The present invention relates generally to a method of producing a fastener member having a multiplicity of resiliently flexible, upstanding hook-like projections, and more particularly to a method of continuously producing such a fastener member by a combined extrusion/roll forming process.

BACKGROUND OF THE INVENTION

Strip-like fastener members comprising a great multiplicity of closely-spaced upstanding hook-like projections are used in many different applications for providing both releasable and semi-permanent connection of associated elements. These types of multi-hook fasteners are typically configured for coaction with a multi-loop or likewise "piled" element, with the multiple hooks engaging the closely-spaced multiple loops to provide the desired connecting or gripping action.

Depending upon the configuration of the multi-hook fastener member, many different types of materials and fabrics are adapted for coaction therewith to effect joining of the associated structures. Not only do such fastening devices have many applications for wearing apparel, recreational equipment, covers for cars and boats, and the like, such devices are further being advantageously employed in applications wherein the highly convenient connecting action promotes joining of associated structures in an essentially permanent manner. For example, such fastening devices are finding ever-increasing use in the automotive industry for efficient fabrication and assembly of components such as seats, interior trim, and the like.

Because the multi-hook fastener element of such fastening devices is often most advantageously and efficiently handled and used in an elongated, continuous strip form, various techniques have been developed for manufacture of such multi-hook fasteners in continuous strips. However, the difficulties associated with forming the large number of relatively small hook-like projections required for the desired fastening action has heretofore led those skilled in the art to resort to relatively complex forming devices and/or processes.

By way of example, U.S. Pat. No. 3,147,528, to Erb, discloses an openable injection mold having a large number of projection-forming cavities which open upwardly to a generally flat surface at the top of the mold. The cavities are defined by a series of separable mold plates. In use, a piece of fabric is positioned atop the mold plates, and moldable material is forced through the fabric so that it enters the cavities of the mold, thus forming a multi-hook fastener member. Since the mold itself is of a discrete length, formation of a continuous strip-like fastener member calls for relatively inefficient sequential or stepwise formation of individual segments of the member in end-to-end relation.

U.S. Pat. No. 3,758,657, to Menzin et al, discloses an apparatus for producing a continuous multi-hook fastener member. The apparatus includes a drum-like apparatus which includes a relatively complex arrangement of shiftable plates at its periphery which define cavities for forming hook-like projections. A plastic extruder is provided in close association with the drum so that as the drum rotates, plastic is injected into the hook-shaped cavities and is joined to a backing strip. Removal of the fastener member thus formed is accomplished by inwardly shifting alternate ones of the cavity-defining plates so that the cavities are opened to permit removal of the hook-like projections.

As will be appreciated, the above forming techniques require relatively complex equipment, and overall efficiency suffers due to the required opening of the hook-forming cavities to permit removal of the hook projections therefrom without damage or unacceptable deformation. The present method of forming a multi-hook fastener member affords a substantial improvement in the efficiency with which such members can be formed by permitting continuous formation of such a strip-like fastener member without unduly complex forming machinery.

Referring once again to the configuration of the multi-hook fastener member and its engagement with a multi-loop fastener member, numerous hook-type engaging elements have been known and utilized in the past. For example, the basic type of hook-type engaging element is constructed from a monofilament loop, generally nylon, one leg of which is either cut or removed to transform the loop into a hook. This configuration represents the original concept for such fasteners. As the fasteners developed and their use became more widespread, the fastener member containing the hook-type engaging elements was sometimes replaced with a fastener member having a plurality of mushroom-shaped engaging elements which function in many ways like hooks, but they had different characteristics in certain other ways. For example, with a standard hook surface, the forces required to peel the standard hook/loop separable members were lower than the forces required to peel the mushroom/loop separable members. Also, the shear forces required to separate the members along the interfacial plane of engagement were much greater with mushroom fasteners than with hook fasteners as demonstrated by comparison tests for comparable sized hooks and mushrooms. Still further, it was found that greater peel forces for the mushroom/loop fastener resulted in a much earlier demise of the loop member, thus causing the cycle life for mushroom/loop fasteners to be much lower than hook/loop fasteners.

When the molded hook fasteners manufactured according to the Menzin et al. inventions as described above were developed, it was found that all other factors being equal, the peeling forces required to separate the molded fastener member from a loop member are somewhat higher than those of standard hook/loop fasteners while the shearing forces required to separate the molded hook from a loop member are also greater than standard hook/loop fasteners. The cycle life for both mushroom/loop and molded hook/loop fasteners are comparable. Thus, it is evident that in environments where high shear capability is required, the presently known molded hook fastener members are unable to compensate for many of the deficiencies of the standard hook/loop fastener and that where high shear strength is required, it has been necessary up to now to resort to mushroom/loop fasteners. In such cases, it has also been necessary to accept the inherent loop destructibility of those fasteners in the peel mode.

For example, fastener applications which require substantial strength in shear are legion. One excellent example is in an article of footwear such as shoes, jogging shoes, sneakers or the like. In such cases where standard hook/loop fasteners did not provide the necessary shear force resistance required for the environment, it has been necessary to either accept the lower shear capability of the hook/loop fastener or to utilize the mushroom/loop fastener and to accept its low loop cycle life. In footwear applications, for example, it was sometimes necessary to resort to newly structured straps, pull-ring combinations, etc. to obtain better shear forces and capability. Other applications which often require substantial shear capability include articles of clothing, industrial applications in light duty machinery, hook and loop fastener kits for hanging articles up on a wall, medical applications, etc. The list can readily be expanded by persons skilled in the art. In such cases with prior art separable fasteners, particularly of the woven or knitted type, it was not possible to increase the strength in shear without affecting the strength in peel. For example, a woven monofilament hook was of one cross-sectional dimension throughout and could not be varied at any cross-section to provide a predetermined fastener characteristic as may be required in a particular application.

My invention relates not only to a unique apparatus and method for conveniently and inexpensively producing molded hook-type fastener member as described, but it also relates to a uniquely configured molded hook-type fastener member which may be predesigned above and beyond the basic inventive hook/loop concept to provide all of the peel benefits of standard hook/loop fastener members while simultaneously providing shear resistance comparable to the mushroom/loop fastener member, or lesser or greater, depending upon need, without the loop destruction encountered with such mushroom fastener members.

SUMMARY OF THE INVENTION

A method of continuously producing an elongated strip-like fastener member is disclosed which employs relatively straightforward forming equipment to provide desired efficiency and economy in the forming of such fastener members. In essence, the present invention contemplates the continuous formation of a strip-like fastener member by forming the member from a continuous extrusion of plastic material. Forming rollers are employed for shaping the extrusion to the desired multi-hook configuration, with one of the rollers defining hook-forming cavities within which the multiplicity of hook-like projections of the finished fastener are formed. Any moldable plastic material may be used; however, polypropylene and/or nylon are preferred for the strip-like fastener member.

Significantly, it has been found that by appropriately cooling the cavity-defining roller, a substantial reduction in the temperature of the fastener member is effected as it is carried by the cavity-defining roller through a substantial portion of a revolution thereof. The highly desirable result of this technique is the capability of removing the fastener from the forming roller without opening the hook-defining cavities thereof. The use of relatively complex forming equipment is thus avoided, with the desirable efficiency of a continuous process facilitating highly economical fabrication of such fastener members.

The fastener member formed in accordance with the present process comprises a base portion, and a great multiplicity of closely-spaced, resiliently flexible hook-like projections which extend integrally from one surface of the base portion. Notably, the hook-like projections of the fastener member include free end portions which extend generally toward the base portion to promote the desired interaction with an associated multi-loop element. This desired interaction is further promoted by the configuration of the hook projections wherein at least some adjacent ones of the projections, in a direction along the length of the fastener member, extend in generally opposite directions.

The present method first comprises the step of forming a strip-like extrusion of molten plastic material which can be very efficiently performed with conventional extruding equipment. Readily extrudable materials such as nylon and polypropylene have been found to provide the finished fastener member with the desired fastening characteristics, but it will be recognized that other extrudable and formable plastic materials may alternately be employed.

The present process further includes the step of providing a first, cooled forming roller having a large plurality of hook-forming cavities defined about its entire periphery. The hook projections of the fastener member are formed within the cavities, with each cavity thus including an inner end portion extending in a direction toward the periphery of the forming roller. To facilitate removal of the hook projections from the cavities, each cavity preferably is provided with an inwardly tapering configuration at the throat of each cavity, i.e., the portion which extends inwardly from the periphery of the forming roller.

The present method further includes providing a second pressure roller in position for coaction with the first forming roller, and concurrently rotating the first and second rollers in opposite directions about respective parallel axes. During practice of the method, a gap is established at the interface of the first and second rollers which generally corresponds to the thickness of the base portion of the fastener member being formed.

Formation of the fastener member is effected by extruding the material into the nip or interface between the first and second rollers so that the plastic material fills the hook-forming cavities in the first, cooled roller. Thus, the fastener member is formed with its base portion and a great multiplicity of hook-like projections extending integrally from one surface of the base portion. In some applications, it can be desirable to relieve the pressure at the laterally opposite sides of the base portion of the fastener member at the interface of the first and second rollers. Pressure relief is accomplished by permitting unconfined lateral flow of the molten plastic material at the roller interface.

As noted, the first forming roller is cooled, and cooling of the fastener member being formed is thus effected by carrying the fastener member on the periphery of the rotating, cooled forming roller. Careful control of the cooling, as well as appropriate selection of the linear forming speed and extrusion temperature, have been found to promote the formation of the multiple hook-like projections without opening of the hook-forming cavities for removal of the projections. Excessive cooling of the forming roller acts to prevent complete filling of the cavities, while insufficient cooling does not sufficiently cool and solidify the plastic material to permit the desired removal of the fastener member from the forming roller without unacceptable deformation of the hook projections.

The continuous fastener member is removed from the cooled forming roller by tensioning the member through the use of belt pullers positioned downstream of the forming rollers. The removal or stripping of the fastener member is effected at a position spaced from the interface of the first and second rollers to thus provide the desired cooling of the fastener member prior to its removal.

During development of the present process, it has been found that the above-described pressure relief at the interface of the first and second rollers can result in the base portion of the fastener member being excessively wide. Depending upon the configuration of the rollers, enlarged bead portions can also be formed at the laterally opposite sides of the base portion attendant the pressure relief of the molten plastic material. To provide the fastener member with its desired finished width, and to avoid any uneven shrinkage or warpage that can occur from the presence of the enlarged bead portions, the present method contemplates trimming the laterally opposite sides of the base portion of the fastener member immediately after removal of the member from the forming roller. For this purpose, a rotatably mounted trim roller is provided, with suitable trimming knives further provided to effect trimming of the fastener member to the desired finished width.

The invention also relates to an elongated fastener member, comprising a base portion and a great multiplicity of resiliently flexible hook-like projections extending from one surface of the base portion, the hook-like projections including free end portions extending generally toward the base portion, with at least some adjacent ones of the projections, in a direction along the length of the member, extending in generally opposite directions, the base portion and integral projections being formed from an extrusion of molten plastic material directed between a pair of coacting, rotating rollers wherein one of the rollers is cooled and defines a plurality of hook-forming cavities in its periphery for forming the hook-like projections, the fastener member being cooled by movement with the one roller before removal of the fastener member from the one roller without opening of the hook-forming cavities.

In one embodiment the product of the present invention is a separable fastener material having on one side a multiplicity of upstanding hook-like engaging elements suitable for repeated face-to-face engagement and disengagement with a material having a multiplicity of upstanding pile loop-like mating engaging elements, which comprises a base member of plastic material, a plurality of upstanding hook-like members molded integrally with the base member, certain of the hook-like engaging elements each having a resilient stem supported at one end thereof on the base member, the stem having at least one arcuately configured side portion, and at least one radial extension on the unsupported end of the stem and extending away from the stem and being resiliently flexible relative thereto. The hook-type engaging elements are characterized by the property that when the fastener material is placed into face-to-face engaged relationship with a second fastener member having a plurality of complementary loop-type engaging elements upstanding from one surface, the hook-type engaging elements penetrate the surface of the second fastener member and engage the complementary loop-type engaging elements of the second fastener member but are readily separable by peeling forces applied substantially normal to the interfacial plane of engagement and the members resist separation by forces parallel to the interfacial plane of engagement due to the engagement of the loop-type engaging elements with the arcuate portions of the stems causing the translation of forces on the loop-type elements tending to direct the loop-type elements toward a predetermined portion of the stem, the arcuate configuration combining with the predetermined thickness of the predetermined portion of the stem to thereby facilitate the predetermination of the forces required to separate the members along the interfacial plane of engagement. Preferred materials are polypropylene and nylon. The invention includes hook-like engaging elements which comprise a resilient stem having arcuate side portions on at least two sides thereof.

Each hook-like engaging element preferably comprises at least two radial extensions on the unsupported end of the stem, the extensions extending in opposite directions. More than two radial extensions are also possible. The stem is tapered on at least one side from its supported end to its unsupported end. Each hook-like engaging element may comprise a stem tapered on at least two—or more-sides from its supported end to its unsupported end. The stem is preferably tapered on one side so as to have a width ratio of about 2:1 and on the second side to have a thickness ratio of at least about 1.5:1 from its supported end to its unsupported end. A generous radius is preferred at the intersection of the stem with the base. The dimension across the free end portion of each stem is preferably at least equal to the corresponding combined dimensions of the radial extensions. Further, the dimension across the free end portion of each stem in any given direction is preferably equal to or greater than the corresponding combined dimensions of the radial extension along the same direction. Also, the thickness of each radial extension is preferably less than the corresponding thickness of the base of the stem.

It will be appreciated that the properties of the hook-like engaging elements can readily be predetermined by predefining the various dimensions, i.e. the cross-sectional diameter and shape of the stem and the radial extension(s), as well as the relative dimensions thereof and the material selection. Thus, a separable fastener can be produced with any combination of predetermined properties such as high peel, low shear, high shear, low peel, high tension, low tension, high cycle life, low cycle life, etc..

An apparatus is also disclosed for continuously providing an elongated strip-like fastener member which comprises a first, cooled forming roller having a plurality of hook-forming cavities defined about the periphery thereof, a second pressure roller positioned for co-action with the first forming roller, means for concurrently rotating the first and second rollers in opposite directions about their respective generally parallel axes, means for forming a strip-like extrusion of molten plastic material adjacent the first and second rollers to be directed therebetween at an interface thereof such that the plastic material fills the hook-forming cavities and forms a strip-like fastener member having a base portion and a great multiplicity of hook-like projections extending from one surface of the base portion and integral therewith. The apparatus further comprises means for removing the strip-like fastener member from the first forming roller at a position spaced from the interface of the first and second rollers such that the hook-like projections are withdrawn from the hook forming cavities after being permitted to become at least partially cooled. The means for forming a strip-like extrusion of plastic material is preferably positioned immediately upstream of the interface of the first and second rollers to facilitate filling of the hook-forming cavities with the plastic material.

The apparatus according to the invention further comprises means for relieving pressure at the lateral opposite sides of the base portion of the fastener member at the interface of the first and second rollers. Means for trimming laterally spaced sides of the base portion of the fastener member after removal thereof from the first forming roller is also provided. Also, the hook-forming cavities are provided in the first forming roller such that the inner end portions of the cavities extend generally in a direction toward the periphery of the forming roller. Further, at least some adjacent ones of the hook-forming cavities, in a circumferential direction of the forming roller, preferably extend in generally opposite directions.

The apparatus according to the invention further comprises means for maintaining the temperature of the cavity-defining periphery of the first forming roller in the range of approximately 100°–150° F. to facilitate complete filling of the cavities and removal of the hook-like projections of the cavities.

In the preferred form, the invention comprises an apparatus for continuously producing an elongated strip-like fastener member having a base portion and a great multiplicity of hook-like projections extending from one surface of the base member and integrally molded therewith, which comprises:

a first, cooled forming roller having a plurality of hook-forming cavities defined about the periphery thereof wherein each the cavity is of an inwardly tapering configuration and includes at least one inner end portion extending in a direction generally toward the periphery of the forming roller;

a second pressure roller in position for coaction with the first forming roller;

means for concurrently rotating the first and second rollers in opposite directions about respective parallel axis;

means for directing a molten extrusion of plastic material in between the first and second rollers at an interface thereof so that the plastic material fills the hook-forming cavities to form the base portion of the strip-like fastener member and with the hook-like projections extending integrally from one surface to the base portion;

means for cooling the forming roller so as to cool the fastener member through a substantial portion of a revolution of the forming roller; and means for removing the strip-like fastener member from the first forming roller at a position spaced from the interface of the first and second rollers by maintaining tension on the elongated fastener member thus-formed so that the hook-like projections are withdrawn from the hook-forming cavities without opening the cavities. Preferably, the forming roller is cooled by water which is directed through interior water passages formed therein.

Numerous other features and advantages of the present invention will become readily apparent from the following detailed description, the accompanying drawings, and the appended claims.

DETAILED DESCRIPTION

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Figures 3, 4:
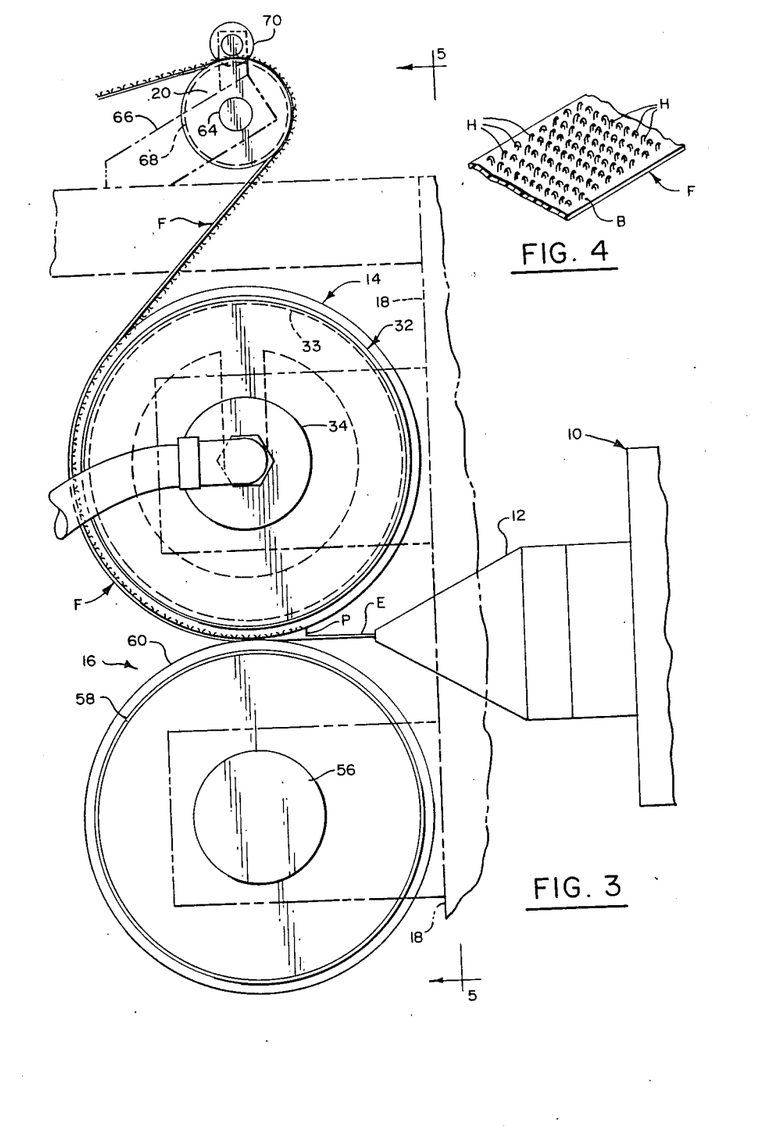
FIG. 3 is a further side elevational view illustrating formation and trimming of a fastener member in accordance with the present method.
FIG. 4 is a perspective view of a portion of the continuous fastener member formed in accordance with the present method.

Referring first to FIG. 4, therein is illustrated a portion of the continuous, elongated strip-like fastener member, designated F, formed in accordance with the present method. The fastener member F is of a multi-hook configuration, and includes a strip-like base portion B from one surface of which integrally projects a great multiplicity of closely-spaced resiliently flexible hook-like projections H. Depending upon the desired application for the fastener member, the base portion B may extend laterally beyond the portion thereof from which hooks H project, thus providing side surfaces through which stitching or the like may be provided for affixing the member in place. Naturally, adhesives, or suitable mechanical fastening means can alternately be employed.

The fastener member F is adapted for fastening coaction with a multi-loop member having a great multiplicity of closely spaced loop elements. Accordingly, a relatively large number of the hook projections H are provided in closely spaced relation. In a current embodiment, the base portion B of the fastener member has been provided with an overall width of approximately 1 inch, with the base portion B including lateral side portions which flank the hook projections H of approximately 3/16 inch each. As will be further described, in one embodiment, approximately 80 hooks per linear inch have been provided. The hook projections H are arranged in "rows" in a direction longitudinally of the fastener member, with approximately seven of the projections H provided in each row per inch of length of the member, and with twelve continuous longitudinal rows of the projections provided.

Notably, each hook projection H is provided with a configuration wherein the free end portion of each projection extends generally toward the base portion B of the fastener member. It should further be noted that adjacent ones of the hook projections face in generally opposite directions in a direction along the length of the fastener member. These features of the construction promote the desired interaction with the associated multi-loop fastener element, and assure the desired gripping or fastening action between the multi-hook fastener member and the multi-loop element.

Figure 1:
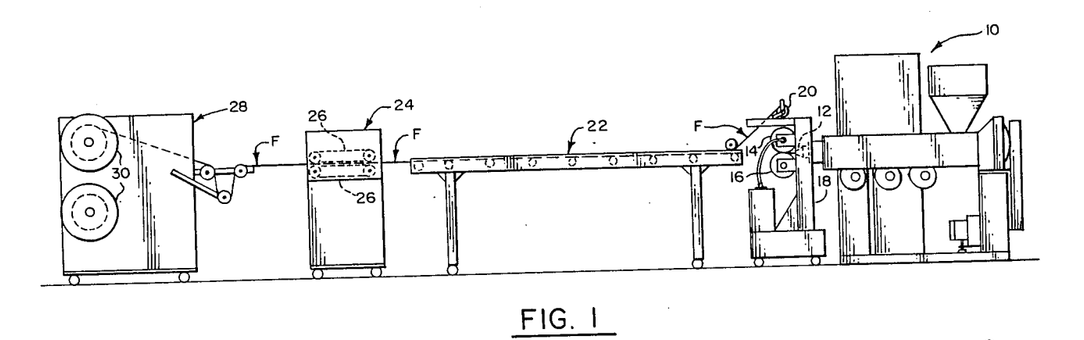
FIG. 1 is a diagrammatic, side elevational view of the apparatus of the invention employed for practicing a method embodying the principles of the present invention.
Figure 2:
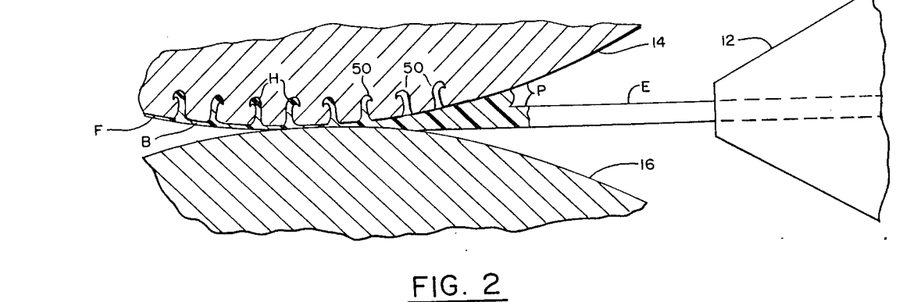
FIG. 2 is an enlarged side elevational view, in partial cross-section, illustrating molten plastic extrusion directed into the nip or interface between first and second coacting forming rollers in accordance with the present invention.

FIG. 1, illustrates the various pieces of equipment which can be employed for practicing the present method. An extruder 10, which may be of a conventional configuration, is provided, and includes an extruder head 12 through which an extrusion, designated E, of molten plastic material is forced.

The forming equipment further includes a pair of first and second forming rollers, respectively designated 14 and 16, which are mounted for concurrent rotation in opposite directions on respective parallel axes on a support frame 18. The first roller 14 comprises a cooled forming roller which defines a great multiplicity of hook-forming cavities about its entire periphery for formation of the hook projections H of the fastener member F. The second roller 16 comprises a pressure roller which coacts with the cooled forming roller for formation of the fastener member. The second pressure roller 16 is preferably mounted for movement relative to the forming roller 14 to facilitate direction of the extrusion E therebetween at the interface of the rollers, to permit adjustment of the gap between the rollers for adjusting the thickness of the base portion B of the fastener member, and to facilitate adjustment of the pressure created at the interface on the molten plastic material.

FIG. 1 further illustrates the provision of an idler-like trim roller 20 rotatably mounted just above forming roller 14. The trim roller 20 is mounted in a position such that the fastener member F being formed is guided thereabout, with the fastener member being removed or stripped from the forming roller 14 immediately upstream of the trim roller 20.

FIG. 1 further illustrates the provision of a cooling conveyor 22 which supports the fastener member F subsequent to its formation. The use of cooling conveyor 22 is optional in practicing the present method in that it is presently preferred that the fastener member F be cooled in ambient air, and thus the member need not necessarily be supported for cooling on a conveyor such as 22.

A driven belt puller 24 is positioned downstream of cooling conveyor 22 for creating tension in the fastener member F for effecting the removal of the fastener member from the forming roller 14. The belt puller 24 may comprise a pair of coacting, opposed puller belts 26 which engage respective upper and lower surfaces of the continuous fastener member F for creating the desired tension therein. Puller belts 26 may comprise suitable neoprene rubber or the like.

A winder 28 positioned downstream of puller 24 effects winding of the finished continuous fastener member F on spools 30 for subsequent shipment, storage and use.

With particular reference now to FIGS. 2-7, the preferred configuration of cooled forming roller 14 will now be described. The forming roller 14 comprises a hollow drum 32 which defines an interior water passage 33 for effecting cooling of the roller. The drum 32 is supported for rotation about its respective axis by a driven support shaft 34 which defines suitable cooling passages 35 which communicate with the interior 33 of the roller drum 32. The support shaft 34 is suitably supported on frame 18 to permit positioning of the forming roller 14 in close association with extruder head 12 of extruder 10.

A forming plate assembly, generally designated 38, is carried on the external surface of the roller drum 32. The external surface of the roller drum is suitably threaded for receiving a pair of ring-like threaded members 40 which are positioned on respective opposite sides of the forming plate assembly 38. This construction facilitates fabrication of the roller 14, and readily permits re-configuration of its cavity-defining periphery as may be required for forming the fastener member F in its desired configuration.

Figures 5, 6, 7:
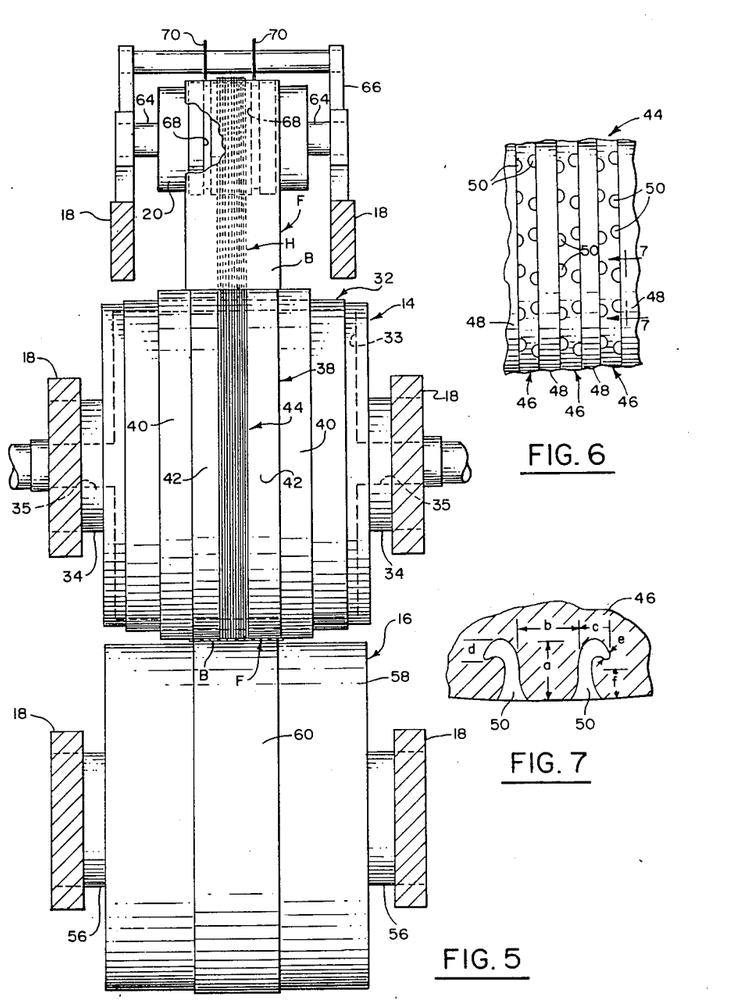
FIG. 5 is a view taken generally along lines 5—5 of FIG. 3 further illustrating formation and trimming of the fastener member formed in accordance with the present method.
FIG. 6 is an enlarged view of the surface of the cooled forming roller employed in the present method illustrating hook-forming cavities in the periphery of the roller.
FIG. 7 is a greatly enlarged side elevational view taken generally along lines 7—7 of FIG. 6 of the hook-forming cavities defined by the cooled forming roller employed in practicing the method incorporating the present invention.

The forming plate assembly 38 includes a pair of ring-like side plates 42 respectively positioned inwardly of the threaded members 40, with the side plates 42 flanking a cavity-defining plate assembly designated 44. As best illustrated in FIG. 6, the plate assembly 44 includes an alternating series of ring-like etched or engraved plates 46, and substantially flat backing plates 48, which together define hook-forming cavities 50 within which hooks H of fastener member F are formed. As will be recognized, this configuration of plate assembly 44 readily facilitates formation of the cavities 50 by suitably etching or engraving the plates 46, and thereafter assembling the series of the etched plates and the backing plates 48 between the side plates 42. The ring-like threaded members 40 thus function in the nature of spanner nuts for holding the plates 42, 46, and 48 in position together on the roller drum 32.

The plates 46 and 48 may comprise suitably hardened steel to facilitate the engraving or etching of the plates 46 for forming the cavities 50. As will be appreciated, the provision of six of the etched plates 46, with opposite sides of each plate suitably etched or engraved, effects formation of fastener member F with twelve continuous longitudinal rows of hook projections H. In a current embodiment, each of plates 46 and 48 have been provided with an outside diameter of 8 inches, and a thickness of 1/16 inch.

FIG. 7 illustrates a current embodiment of the hook-forming cavities 50. In this embodiment, each cavity is provided with a dimension at "a" of approximately 0.093 inches, with spacing between the cavities at dimension "b" being approximately 0.09 inches. The dimension of each cavity in a direction peripherally of the forming roll 14 is designated at "c" and is on the order of 0.075 inches. The free end portion of each cavity which extends generally toward the periphery of the plate 46 is indicated at "d" and is approximately 0.045 inches. The end portion of each cavity at dimension "e" is on the order of approximately 0.03 inches.

The above-described dimensions for the hook-forming cavities 50 have been specifically selected to facilitate both complete filling of the cavities during formation of the hook projections H as well as removal of the projections H from the cavities without opening of the cavities. In this regard, it will be noted that the base portion or throat of each cavity 50 which opens toward the periphery of the forming roller is provided with a tapering configuration at dimension "f" for approximately 0.03 to 0.045 inches. In the region of each cavity 50 where the dimension "f" is indicated, each cavity is provided with a "depth" (i.e., the depth of engraving or etching) which is preferably on the order of 0.015 inches or greater. The depth of each cavity beyond this relatively enlarged portion is preferably on the order of 0.01 inches. As will be recognized, the above-identified dimensions are intended as illustrative, and it will be recognized that many variations are possible with respect to the exact size, shape, and relative positioning of the cavities 50 in keeping with the principles disclosed herein.

As will be evident from the drawings, the hook-forming cavities 50 are provided in the periphery of the forming roller 14 such that adjacent ones of the cavities, in a direction circumferentially of the roller, extend or face in generally opposite directions. As noted, the hook projections H of fastener member F thus-formed are thereby configured for providing the desired gripping or fastening action with an associated multi-loop fastener element. It is important to note that the present method permits formation of the fastener member F with this desired configuration without unacceptable deformation of the hook projections H as they are removed from the hook-forming cavities 50 without opening of the cavities.

The configuration of the pressure roller 16 will now be described. Pressure roller 16 is supported on frame 18 for driven rotational movement by driven shaft 56. The pressure roller 16 is preferably sufficiently cooled to avoid adhesion of the plastic material to its roll surface and comprises a roller drum 58 upon which a ring-like plate 60 is positioned for providing a forming surface for coaction with the forming plate assembly 38 of forming roller 14. By this arrangement, the rollers 14 and 16 are supported for concurrent rotation in opposite directions about respective parallel axes. To facilitate convenient relative positioning of the forming roller 14 and the pressure roller 16 for forming the base portion B of fastener member F to the desired thickness, the rollers are preferably supported on support frame 18 for relative movement, such as by suitable air pressure cylinders or the like operatively associated with the shaft 56 of pressure roller 16. The use of air pressure biasing of the pressure roller 16 into a position for coaction with the forming roller 14 desirably provides a means by which the pressure which is created at the interface of the rollers can be adjusted.

As best shown in FIG. 5, the forming roller 14 and the pressure roller 16 are configured to permit relief of pressure at the laterally opposite sides of their interface so that the lateral flow of plastic material at the interface is unconfined. This arrangement has been found to provide added flexibility in practicing the present method since sufficient molten plastic material can be provided in the form of extrusion E to assure complete filling of the hook-forming cavities 50, while at the same time excessive pressure is not created at the interface which could otherwise act to urge the rollers 14 and 16 away from each other. As will be appreciated, appropriate selection of the linear forming speeds of the fastener member F, as well as appropriate temperature control can avoid the need for providing pressure relief at the roller interface. In this regard, it will be observed in FIG. 2 that an enlarged "bank" designated P is formed just upstream of the interface of the forming roller 14 and the pressure roller 16. While it is desired that the bank P be of minimum dimension to avoid urging the rollers 14 and 16 apart, the creation of this bank assures the presence of an adequate supply of molten plastic material for complete filling of the hook-forming cavities 50.

As best illustrated in FIG. 5, it can be desirable to trim the laterally opposite sides of base portion B of fastener member F so that the fastener member is provided in its desired finished width. Trimming in this manner is preferably effected as soon as possible after the formed fastener member F is removed or stripped from forming roller 14, and to this end, the idler-like trim roller 20 is provided just above forming roller 14. The trim roller 62 is suitably rotatably supported by a trim roller shaft 64 mounted in a frame 66 above frame 18. The trim roller 62 is preferably provided with a pair of spaced machined grooves 68 which generally correspond in lateral spacing to the width of the finished fastener member F. Trimming is effected by a pair of trim blades 70 carried on the frame 66, with the provision of grooves 68 permitting the blades 70 to efficiently cut and trim the strip-like fastener member without undue wear of the blades.

Trimming of the laterally opposite sides of base portion B of the fastener member can be particularly desirable in conjunction with formation of the fastener member with pressure reliefs at the laterally opposite sides of the interface of rollers 14 and 16. Not only does the trimming step desirably effect reduction of the fastener member F to its desired finished width, the trimming operation affords the further advantage of facilitating formation of the fastener member without any warpage or unevenness. Such unevenness can result from uneven shrinkage which could otherwise occur attendant to formation of the base portion B with pressure reliefs at the interface of rollers 14 and 16. Such trimming is particularly desirable if the base portion B is initially formed with enlarged bead portions at its laterally opposite edges (again for purposes of pressure relief) since uneven shrinkage which can occur without trimming can result in the finished fastener member F taking on a somewhat "wavy" configuration. Notably, the trimmed portions of the fastener member can be recycled through extruder 10 for efficient use of materials.

During development of the present method, the fastener member F has been formed from both polypropylene and nylon. While polypropylene plastic resins are somewhat easier to extrude and process, the hook projections H of the resultant fastener member F are somewhat more flexible than when the fastener member is formed from nylon, and thus the gripping force generated with an associated multi-loop element is somewhat less. While fabrication from nylon calls for higher extrusion temperatures, the resultant fastener member is provided with hook projections H which are of relatively greater rigidity and resilience, and thus a greater fastening or gripping force is created when the fastener member is positioned in association with a multi-loop fastener element.

In forming the fastener member F from polypropylene plastic material, the material is preferably extruded from extruder 10 at a temperature on the order of approximately 380°–440° F. The extrusion E from extruder head 12 is preferably on the order of approximately ⅛ inch thick with a width of approximately 1 inch for forming the fastener member F with a finished width of approximately 1 inch (after trimming), with the base portion B of the fastener member being approximately 0.01–0.012 inches thick.

A linear forming speed on the order of 30–45 feet/minute has been found to facilitate the desired complete formation of the hook projections H in the hook-forming cavities 50 of the forming roller 14. In this regard, the best results have been obtained by maintaining the temperature of the surface of the forming roller 14 in the range of approximately 100°–150° F. As will be observed from the drawings, the fastener member F is carried on the periphery of the rotating forming roller 14 through approximately 120°–180° of rotation of the forming roller before the fastener member is removed or stripped from the forming roller by guidance about trim roller 62. In this manner a substantial reduction in the temperature of the plastic material is effected, with this reduction being on the order of 250°–350° F.

Formation of fastener member F from Celanese Nylon No. 1200, natural, has been effected with extrusion temperatures on the order of approximately 550° F. A linear forming speed of approximately 40–45 feet/minute has provided the desired results, again with the temperature of the surface of the forming roller 14 being maintained in the range of approximately 100°–150° F. A temperature reduction in the plastic material of approximately 300°–350° F. is effected as the fastener member is carried on the cooled forming roller 14.

From the foregoing description of the present method and the fastener member thus obtained, it will be appreciated that many different aspects of the method can be selectively varied for achieving the results desired. The tension which is created within the completed fastener member F by belt puller 24 can be readily adjusted and varied by altering the speed of the puller and/or the speed of the forming and pressure rollers 14 and 16. The linear forming speed of the fastener member can likewise be readily varied, with the understanding that proper cooling of the forming roller 14 is necessary to assure complete filling of the hook-forming cavities 50 while still permitting solidification and withdrawal of the hook projections H of the fastener member from the cavities without unacceptable deformation. While polypropylene and nylon have been successfully employed for practicing the present method, it will be appreciated that many different plastic materials lend themselves to use in forming the fastener member F by the continuous method of the present invention.

Figure 8:
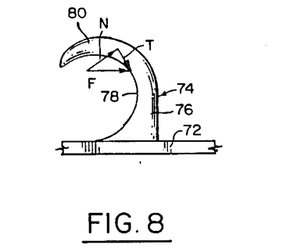
FIG. 8 is a side view of the hook fastener member of the present invention illustrating a preferred single hook configuration.

Referring now to FIG. 8, there is illustrated a preferred form of the hook fastener member constructed according to the present invention. A base member 72 is illustrated having a typical hook-type engaging element 74 upstanding from one surface thereof. For convenience of illustration of the advantages of the present hook configuration the engaging element 74 is formed of an upstanding stem 76 which is preferably tapered as shown and which significantly includes arcuately configured portion 78 on one side as shown. On the unsupported end of the stem there is connected a radial extension 80 which extends away from the stem and is resiliently flexible relative to the stem. The operative features and advantages of this hook configuration will now be described.

When the hook fastener member as shown in FIG. 8 is placed in face-to-face engagement with a complementary fastener member having a surface of upstanding loops (or other loop-type engaging elements) the hook-type engaging elements as shown and described penetrate the surface of the loop-type member and engage the complementary loop-type engaging elements. These fastener members are thus readily separable by peeling forces applied generally normal to the interfacial plane of engagement, which plane is generally parallel to the respective base members of the two fastener members and lies somewhat medially therebetween.

Referring for example to the hook illustrated in FIG. 8 it will be observed that the stem 76 is tapered from the base to the unsupported end. The radial extension 80 flexes mechanically and resiliently relative to the stem when the fastener members are pressed together or peeled apart thus permitting the relative peeling of the fastener members. It will be observed that with the hook of FIG. 8, whenever shear forces are applied to the two members as illustrated schematically in FIG. 9 by the force lines F, these force lines F cause further engagement between the loop 82 and the hook 76 by translation of downward forces on the loop thereby causing the loop to ride downwardly along the arcuate surface 78 of hook 76 as shown schematically by the arcuate arrow A in FIG. 9. Thus, it will be appreciated that the configuration of hook 76 with its unique arcuate side portion, assists in directing any loops engaged therewith toward a predetermined portion of the stem, in this case, the medial portion of the stem which is the portion of greatest strength. This is actually formed by the tangential component T of the shear force F which acts downwardly on the loop as shown schematically in FIG. 8, for example. Normal component N is also shown.

Thus, by carefully and precisely dimensioning the stem of each hook in its cross-section and its arcuate side portion,, the strength of the stem in the fastener shear mode can be increased or decreased depending upon its cross-sectional area, and consequently, its strength in shear. In particular, since the arcuate portion of the stem will normally direct the loop or loops to a predetermined portion when in shear, it will be observed that the strength of the fastener in shear can thus be predetermined by carefully selecting the cross-sectional area of the stem, not only at its base but at its medial section, i.e. the section which will receive the hook or loops when they slide along the arcuate stem portion when the fastener is in the shear mode. The particular advantage accruing from these features is that the radial extension 80 shown in FIG. 8 will still determine the peel strength of the fastener while the shear strength will be independently determined. Thus, it will readily become clear to persons skilled in the art that these features make it possible to increase or decrease the strength of the fastener in the peel mode while increasing or decreasing, as may be desired, the strength of the fastener in the shear mode. Thus this makes it possible to provide a separable fastener of this type with varying capabilities as needed, namely, low peel, high shear, high cycle life, high peel, low shear, high cycle life; etc. etc. and any variations thereof.

Figure 9:
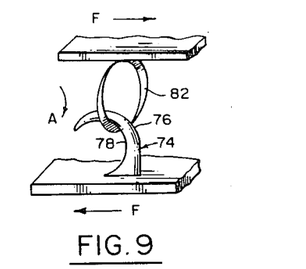
FIG. 9 is a perspective view of the hook fastener member of FIG. 8 in engagement with a complementary loop fastener member and illustrating the unique shear strength properties of the present invention.

In addition, it will be observed that the hook of FIGS. 8 and 9 is operative to provide the unique shear action as described only in the direction of the Forces F in that FIG., thus leaving the shear capability in the opposite direction relatively unaffected and substantially the same as the standard hook fastener member. Alternately, as mentioned previously, alternate hooks can be formed in respectively opposite directions to provide two direction limited shear capability.

Figures 10, 11:
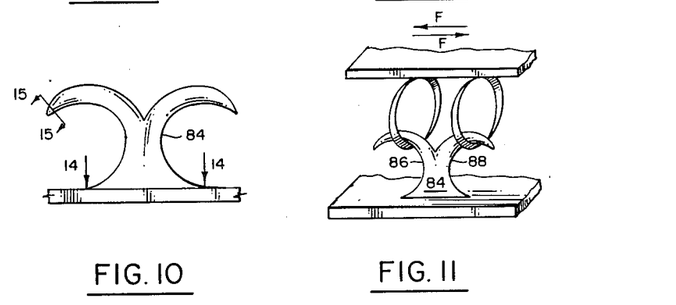
FIG. 10 is a side view of the hook fastener member of the present invention illustrating a preferred double hook configuration.
FIG. 11 is a perspective view of the double hook fastener member of FIG. 10 in engagement with a complementary loop fastener member and illustrating the unique shear strength properties of the present invention.

This observation directs one to the embodiment of FIG. 10 in which is illustrated a double hook version 84 of the single hook embodiment 76 of FIG. 8. As will be observed by referring to FIG. 11, the translation of shear forces to the downward (or tangential) direction results in the tendency for the loops to ride along the arcuate—or curved-sides 86 and 88 of the double hook 84 shown in that FIG. This tends to increase the shear strength of the fastener in both directions along the lines of shear forces F illustrated in FIG. 11. Thus, where dual direction shear strength of relatively substantial magnitude is required, the double hook version of FIG. 11 can be provided in combination with a tapered stem, as well as a predetermined cross-sectional area thereof at the base member as well as at the medial portion (to which the loops will be directed) to thereby provide a predetermined shear capability in both directions. It is sufficient to say that a person skilled in the art can use his inventive imagination to provide numerous variations of this concept and that shear strength in three or four directions can also be provided by molding either a triple or a quadruple version of the hook tape shown in FIG. 10. Such tape will include one or two additional radial extensions turned 90° from those shown, i.e. extending into and out of the plane of the paper.

Figure 12:
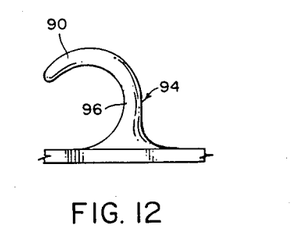
FIG. 12 is a side view of the hook fastener tape of the present invention illustrating an alternate configuration of the single hook embodiment.
Figure 13:
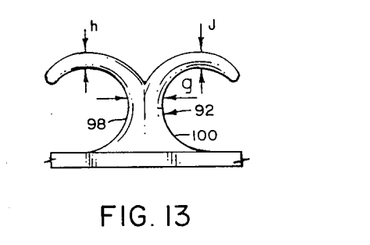
FIG. 13 is a perspective view of an alternate embodiment of the hook fastener member of the present invention illustrating an alternate double hook configuration.
Figure 14:
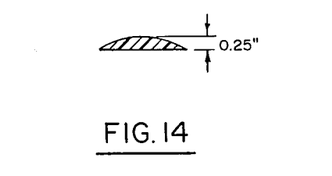
FIG. 14 is a view taken along lines 14—14 of FIG. 13 illustrating the thickness of the hook-element at the base.
Figure 15:
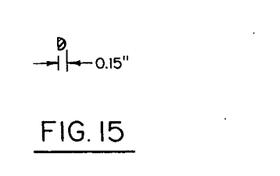
FIG. 15 is a view taken along lines 15—15 of FIG. 13 illustrating the thickness of the radial extension at the tip.

Referring now to FIGS. 12 and 13 there is illustrated two exemplary embodiments of the present fastener member showing a single hook 94 somewhat similar to the hook of FIG. 8 but containing a radial extension 90 and a tip portion having somewhat more of a rounded configuration which configuration facilitates reduction of peel strength and correspondingly increases loop cycle life. In FIG. 13 there is illustrated a double hook version 92 of the hook of FIG. 12. It will be observed that the hooks of FIGS. 12 and 13 are tapered and contain arcuate surfaces 96, 98 and 100 respectively, shown in the drawings which arcuate surface portions facilitate the predetermination of the shear strength capability of the hook as described hereinabove. In FIG. 13, dimension "g" is preferably equal to or more than the combined dimensions "h" and "j" not only to facilitate removal from the mold, but to improve the peel, shear and loop cycle life as described above. Moreover, the interface between the hooks 94 in FIG. 12 and 92 in FIG. 13 are blended and continuous as defined by generous radius 96 in FIG. 12 and 98 in FIG. 13 to facilitate both entry of the molten plastic material into the forming mold, and removal therefrom of the final product when it is at least partially cooled as described hereinabove. Further, these generous radii facilitate resilient flexing of the respective stems of the hook elements. Moreover, it has been found preferable to taper the hook elements from the base member to the tips of the radial extensions in the thickness dimensions (i.e. perpendicular to the plane of the paper) as well as is shown in the dimension in the plane of the paper. The tapering which is perpendicular to the plane of the paper has been found to be preferably accomplished by providing a typical thickness of the hook at the base member and a typical thickness of the radial extension(s) at the tip. Referring for example to FIGS. 14 and 15, one exemplary draft provides for a hook thickness of say 0.025 inches at the base and a radial extension thickness of say 0.015 inches at the tip—all measured perpendicular to the plane of the paper as shown.

In a typical comparison test between the hook fastener member of the classical hook-type and the hook fastener member of the mushroom type, all being comparable in size, the following normalized values were obtained:

|  |  | Woven Hook 80/LP | Woven Mushroom/LP |
|---|---|---|---|
| Peel (PIW) | SAMPLE 1 | 1.05 | 5.60 |
|  | SAMPLE 2 | 0.95 | 2.40 |
| Shear (PSI) | SAMPLE 1 | 11.5 | 88.8 |
|  | SAMPLE 2 | 9.0 | 78.7 |
| Cycle Life |  | 10,000 | 100.00 | where:
A. (PIW) is "pounds per inch width".
B. (PSI) is "pounds per square inch".
C. Cycle life is measured in cycles.
D. LP means the fastener is mated with loop fastener material.
"80" signifies 8.0 mils in height for the hooks and mushrooms (where 1 mil = .001 inch).

In a comparison of the present inventive double hook fastener member as shown in FIG. 10 with a complementary loop fastener member as shown in FIG. 11 against a molded hook fastener member manufactured according to the Menzin et al. patents described hereinabove, the following comparative results were obtained from samples of comparable dimensions:

|  | Nylon Prior Art Molded Double Hook Fastener | Polypropylene Prior Art Molded Double Hook Fastener | FIG. 10 Polypropylene Double Hook Fastener |
|---|---|---|---|
| Peel (PIW) | 2.91 | 1.50 | 2.75 |
| Shear (PSI) | 26.30 | 12.00 | 49.30 |
| Tension | 11.00 | 5.00 | 6.00 |
| Cycle Life In Peel Mode | 28.00 | 25.00 | 24.00 | where:
A. "PIW" is pounds per inch width.
B. "PSI" is pounds per inch width.
C. "Tension" is the tension forces required to separate the members in directions opposite their fastening direction, not in peel.
D. "Cycle Life" is the percentage of the original shear strength retained after 500 cycles.

Thus, from this comparative example it can be seen that the hook fastener member of the present invention—in polypropylene form—displays greater strength in shear than the molded prior art fastener member in the polypropylene, as well as the nylon forms. For peel, the polypropylene fastener of the invention is superior to the prior art molded polypropylene fastener and is comparable to the nylon prior art fastener.

Thus, from the above consideration it can be readily seen that the arcuate portions of the hook fastener member can be so configured and combined with the degree of taper of the stem and the relative cross-sectional areas of the stem at its base and/or at its medial portion to thereby predetermine the forces necessary to separate the fastener members in peel and shear, while at the same time optimizing the cycle life as necessary or desired for a given application. Shear strength, for example, can be readily multiplied several times while leaving peel and cycle life unaffected, a task which was not possible with prior art fasteners of this type. It will be appreciated that this inventive hook fastener tape has all of the advantages of the prior art as well as the advantages described hereinabove, while avoiding the disadvantages inherent and normally uncontrollable in the prior art fasteners.

It will be left only to the imagination of the artisan to devise combinations of variously configured radial extensions and stem cross-sectional area and tapered configurations so as to predetermine the peel strength, the shear strength, and the cycle life according to design without the necessity of compromising one property for the other as was generally the case in the prior art.

From the foregoing, it will also be observed that numerous modifications and variations can be effected without departing from the true spirit and scope of the novel concept of the present invention. It is to be understood that no limitation with respect to the specific embodiment disclosed herein is intended or should be inferred. It is, of course, intended to cover by the appended claims all such modifications as may fall within the scope of the claims.

What is claimed is:

1. An apparatus for continuously providing an elongated strip-like member which comprises:
    a first, cooled unitary forming roller having a plurality of hook-forming cavities defined in the periphery thereof and extending inwardly therefrom;
    a second pressure roller positioned for coaction with said first forming roller;
    means for concurrently rotating said first and second rollers in opposite directions about their respective generally parallel axes;
    means for forming a strip-like extrusion of molten plastic material adjacent said first and second rollers to be directed therebetween at an interface thereof such that said plastic material fills hook-forming cavities and forms a strip-like member having a base portion and a great multiplicity of hook-like projections extending from one surface of said base portion and integral therewith;
    means for removing said strip-like member from said first forming roller at a position spaced from the interface of said first and second rollers such that said hook-like projections are withdrawn from said hook forming cavities without opening said cavities after being cooled by the first forming roller to a desired temperature.

2. The apparatus according to claim 1 wherein said means for forming a strip-like extrusion of plastic material is positioned immediately upstream of the interface of said first and second rollers to facilitate filling of said hook-forming cavities with said plastic material.

3. The apparatus according to claim 2, wherein the forming rollers are configured to permit relief of pressure at the lateral opposite sides of the interface of said first and second rollers so that the lateral flow of plastic material at the interface is unconfined.

4. The apparatus according to claim 1 further comprising means for trimming laterally spaced sides of said base portion of said strip-like member after removal thereof from said first forming roller.

5. The apparatus according to claim 1 wherein said hook-forming cavities are provided in said first forming roller such that the inner end portions of said cavities extend generally in a direction toward the periphery of said forming roller.

6. The apparatus according to claim 1 wherein said hook-forming cavities are provided in said first forming roller such that at least some adjacent ones of said cavities, in a circumferential direction of said forming roller, extend in generally opposite directions.

7. The apparatus according to claim 1 further comprising means for maintaining the temperature of the cavity-defining periphery of said first forming roller in the range of approximately 100°–150° F. to facilitate complete filling of the cavities and removal of said hook-like projections of said cavities.

8. An apparatus for continuously producing an elongated strip-like member having a base portion and a great multiplicity of hook-like projections extending from one surface of said base member and integrally molded therewith, which comprises:
    a first, cooled unitary forming roller having a plurality of hook-forming cavities defined in the periphery thereof and extending inwardly therefrom wherein each said cavity is of a tapering configuration and includes at least one inner end portion extending in a directinn generally toward the periphery of said forming roller;
    a second pressure roller in position for coaction with said first forming roller;
    means for concurrently rotating said first and second rollers in opposite directions about respective parallel axis;
    means for directing a molten extrusion of plastic material in between said first and second rollers at an interface thereof so that said plastic material fills said hook-forming cavities to form said base portions of said strip-like member and with said hook-like projections extending integrally from one surface to the base portion;
    means for cooling said forming roller so as to cool said strip-like member to a desired temperature; and
    means for effective to remove said strip-like member from said first forming roller at a position spaced from the interface of said first and second rollers by merely maintaining tension on the elongated strip-like member thus-formed so that said hook-like projections are withdrawn from said hook-forming cavities without opening said cavities.

9. The apparatus according to claim 8 wherein said first forming roller includes hook-forming cavities oriented such that at least some adjacent ones of said cavities in a circumferential direction of said forming roller, extend in generally opposite directions.

10. The apparatus according to claim 8 further comprising means for trimming laterally opposite sides of said base portion of said strip-like member after removal thereof from said first forming roller.

11. The apparatus according to claim 8, wherein the forming rollers are configured to permit relief of pressure at the lateral oppposite sides of the interface of said first and second rollers by permitting unconfined lateral flow of said molten plastic material at said interface.

12. The apparatus according to claim 8 further comprising means for maintaining the temperature of the periphery of said first forming roller in the range of approximately 100°–150° F.

13. The apparatus according to claim 8 wherein said first forming roller is comprised of a plurality of plates positioned in face-to-face contacting relation, certain of said plates defining said hook-forming cavities.

14. The apparatus according to claim 8 wherein said hook-forming cavities are comprised of a first tapered stem portion and at least one radial extension forming portion extending away from the inner end of said stem forming portion.

15. The apparatus according to claim 14 wherein said hook-forming cavities comprise at least two opposed radial extension forming portions extending away from the inner end portion of said stem forming portion.

16. The apparatus according to claim 14 wherein said stem forming portion is tapered and defines at least one arcuate surface forming portion.

17. The apparatus according to claim 8 wherein said hook forming cavities are tapered in two directions, the first direction extending into said first forming roller and second direction extending perpendicular to said first direction and defining a tapered thickness of said hook-elements formed thereby.

18. The apparatus according to claim 8 wherein said hook-forming cavities are defined by at least one generous radius at the periphery of said first forming roller.

19. The apparatus according to claim 8 wherein said hook-forming cavities are defined by at least two generous radii at the periphery of said first-forming roller.

* * * * *